(12) United States Patent
McEwen-King et al.

(10) Patent No.: US 10,352,763 B2
(45) Date of Patent: Jul. 16, 2019

(54) DETECTION OF MOVING OBJECTS

(75) Inventors: Magnus McEwen-King, Farnborough (GB); David John Hill, Dorchester (GB); Alastair Godfrey, Farnborough (GB)

(73) Assignee: OPTASENSE HOLDINGS LIMITED (GB)

( * ) Notice: Subject to any disclaimer, the term of this patent is extended or adjusted under 35 U.S.C. 154(b) by 927 days.

(21) Appl. No.: 13/816,896

(22) PCT Filed: Aug. 15, 2011

(86) PCT No.: PCT/GB2011/001220
§ 371 (c)(1),
(2), (4) Date: Feb. 13, 2013

(87) PCT Pub. No.: WO2012/022934
PCT Pub. Date: Feb. 23, 2012

(65) Prior Publication Data
US 2013/0151203 A1 Jun. 13, 2013

(30) Foreign Application Priority Data
Aug. 16, 2010 (GB) .................................. 1013704.0

(51) Int. Cl.
*G01H 9/00* (2006.01)
*G06F 17/00* (2019.01)

(52) U.S. Cl.
CPC ............. *G01H 9/004* (2013.01); *G06F 17/00* (2013.01)

(58) Field of Classification Search
CPC ................................ G01H 9/004; G06F 17/00
(Continued)

(56) References Cited

U.S. PATENT DOCUMENTS 5,194,847 A  3/1993 Taylor et al.
6,100,969 A * 8/2000 Perez ................. G01N 21/1702
                                                356/73.1
(Continued)

FOREIGN PATENT DOCUMENTS

GB           2442745      4/2008
WO      WO2010/020795     2/2010
WO      WO 2010/055293    5/2010

OTHER PUBLICATIONS

Kirkendall et al., "Distributed Fiber Optic Sensing for Homeland Security", Jan. 1, 2007, retrieved from internet: https://www.nrl.navy.mil/content_images/07Optical_Kirkendall.pdf. [retrieved on Apr. 3, 2017].

*Primary Examiner* — Ricky Ngon
(74) *Attorney, Agent, or Firm* — McDonnell Boehnen Hulbert & Berghoff LLP

(57) ABSTRACT

A system for moving object (402) detection is provided, the system comprising a fiber optic interrogator (106) adapted to provide distributed acoustic sensing on a optic fiber (104), for example arranged along a border. The measurement signals from each of a plurality of sensing portions (404, 406, 408, 410, 412) of said fiber are analyzed to determined a characteristic of a Doppler shift. The characteristic of a Doppler shift may be a generally continuous decrease in detected frequency. By detecting the time at which the rate of change of frequency is at a maximum for each of the sensing portions the time of closest approach (ti, t2, t3, t4, t5) of the object to those sensing portions can be determined with the sensing portion the object approaches closest to showing the greatest value of maximum rate of change of frequency. The distance of closest approach and velocity can be determined.

24 Claims, 4 Drawing Sheets

(58) Field of Classification Search
USPC .......................................................... 702/189
See application file for complete search history.

(56) References Cited

U.S. PATENT DOCUMENTS

| | | | | |
|---|---|---|---|---|
| 6,271,766 | B1* | 8/2001 | Didden | G01D 5/35383 |
| | | | | 340/853.1 |
| 7,536,388 | B2 | 5/2009 | Jung et al. | |
| 8,059,489 | B1* | 11/2011 | Lee et al. | 367/136 |
| 2009/0257314 | A1* | 10/2009 | Davis et al. | G01S 5/18 |
| | | | | 367/125 |
| 2010/0158431 | A1* | 6/2010 | Huffman | G01H 9/004 |
| | | | | 385/12 |
| 2010/0166357 | A1 | 7/2010 | Huffman et al. | |
| 2012/0020184 | A1* | 1/2012 | Wilson | G01H 9/004 |
| | | | | 367/16 |
| 2012/0075121 | A1* | 3/2012 | O'Hara | G08G 5/06 |
| | | | | 340/961 |
| 2014/0160888 | A1* | 6/2014 | Childers | G01V 1/40 |
| | | | | 367/25 |

* cited by examiner

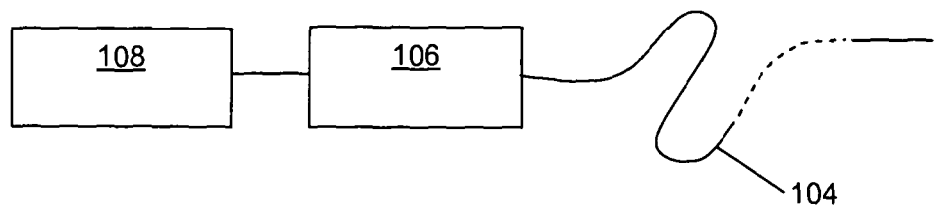
Fig. 1
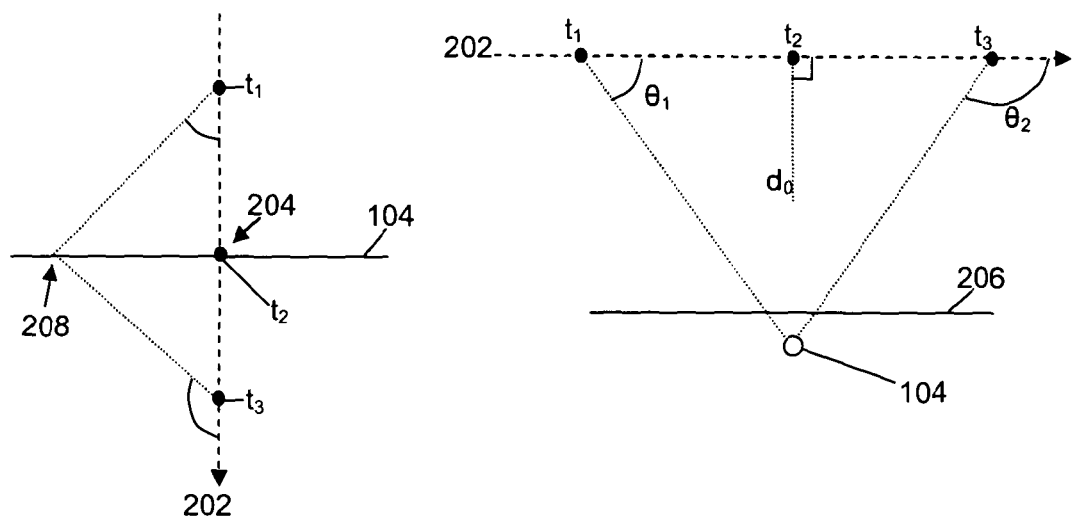
Fig. 2a
Fig. 2b
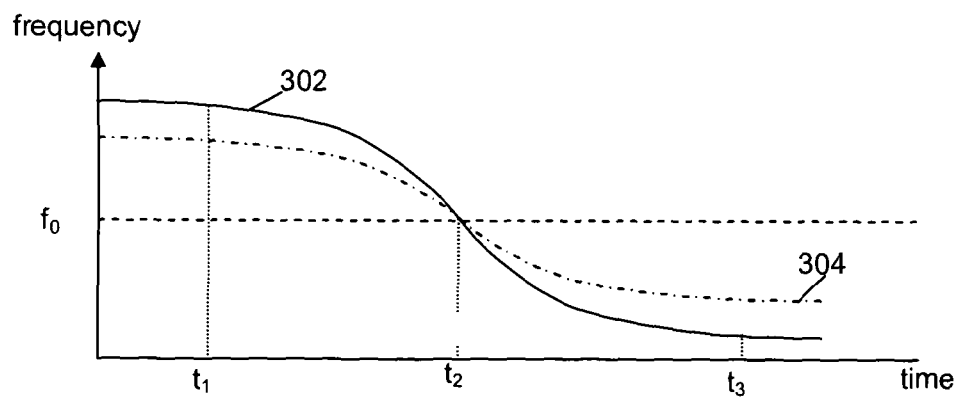
Fig. 3

DETECTION OF MOVING OBJECTS

FIELD OF THE INVENTION

The present invention relates to detection of moving objects using distributed acoustic sensing.

BACKGROUND OF THE INVENTION

Distributed acoustic sensing (DAS) is a known technique wherein a length of optical fibre is interrogated, usually by one or more input pulses of light, to provide substantially continuous sensing of vibration activity along the length of the optical fibre.

Optical pulses are launched into the fibre and the radiation backscattered from within the fibre is detected and analysed. The intrinsic scattering from a continuous length of optical fibre is detected. Such sensors allow use of standard fibre optic cable without the need for deliberately introduced reflection sites such fibre Bragg gratings or the like. The entire optical fibre from which a backscatter signal can be detected can be used as part of the sensor. Time division techniques are typically used to divide the signal returns into a number of time bins, with the returns in each time bin corresponding to a different portion of the optical fibre. Such fibre optic sensors are referred to as distributed fibre optic sensors as the discrete sensing portions are fully distributed throughout the entire optical fibre.

Within each discrete sensing portion vibrations or strains of the fibre, for instance from acoustic sources, cause a variation in the characteristics of the radiation which is backscattered from that portion. This variation can be detected and analysed and used to give a measure of the disturbance of the fibre at that sensing portion. As used in this specification the term "distributed acoustic sensor" will be taken to mean a sensor comprising an optical fibre which is interrogated optically to provide a plurality of discrete acoustic sensing portions distributed longitudinally along the fibre and acoustic shall be taken to mean any type of mechanical vibration or pressure wave.

DAS therefore provides useful and convenient sensing solutions that can monitor long lengths of optical fibre with good spatial resolution. For instance a DAS sensor can be implemented with sensing portions of the order of 10 m long in up to 40 km or more of optical fibre, i.e. the 40 km length of fibre may be interrogated to provide 4000 contiguous acoustic sensing portions, each of 10 m in length.

Various types of DAS sensor are known and have been proposed for use in various applications. For instance such systems have been proposed for perimeter monitoring to detect the movement of land vehicles and personnel using a buried fibre optic cable. As a vehicle travels towards the buried fibre acoustic signals travel through the ground to the buried cable and the disturbance can be detected.

U.S. Pat. No. 5,194,847 describes a distributed acoustic fibre optic sensor for border monitoring and intrusion sensing. Coherent light is launched into an optical fibre and any light which is Rayleigh backscattered within the optical fibre is detected and analysed. A change in the backscattered light in a time bin is indicative of an acoustic or pressure wave incident on the relevant portion of optical fibre. In this way acoustic disturbances any portion of the fibre can be detected, which can be used as indication of an intruder. It is suggested that the optical fibre may be buried to detect foot or vehicular ground traffic or that an optical fibre placed above ground may be used to detect low-flying aircraft.

The ability to detect aircraft would be advantageous, especially in some border monitoring applications where other systems to detect aircraft crossing a border may not exists or would be unduly expensive.

GB patent application publication No. 2,442,745 describes a different fibre optic DAS system wherein a plurality of groups of pulse modulated electromagnetic waves are launched into a standard optical fibre. The frequency of one pulse within a group differs from the frequency of another pulse in the group. The Rayleigh backscattering of light from intrinsic reflection sites within the fibre is sampled and demodulated at the frequency difference between the pulses in a group.

Such DAS sensor systems can usefully be employed in perimeter monitoring to detect movement of personnel on the ground in the vicinity of the optical fibre, or to detect a vehicle crossing the optical fibre. However typically such systems simply indicate that a vehicle may have crossed at a particular location along the optical fibre. It would be useful to be able to provide more information about an object moving in the vicinity of the border. It is an object of the present invention to provide methods and apparatus for detecting moving objects using DAS.

SUMMARY OF THE INVENTION

Thus according to the present invention there is provided a distributed acoustic sensor apparatus comprising: an interrogator unit for, in use, interrogating an optical fibre with optical radiation and producing a measurement signal indicative of incident acoustic signals from each of a plurality of sensing portions of said optical fibre; and a processor configured to analyse said measurement signals to identify a signal characteristic of a Doppler shift so as to detect a moving object.

The present invention therefore relates to a distributed acoustic sensing (DAS) apparatus wherein the measurement signals from each of a plurality of sensing portions of fibre, i.e. the signal indicating any acoustic signals incident at the sensing portion, are analysed to identify a characteristic of a Doppler shift in order to detect a moving object.

The frequency of the measurement signals may therefore be analysed to identify the characteristic of a Doppler shift. The frequency of the signals may be analysed to detect a relatively intense signal with a relatively narrow frequency band, i.e. a reasonably strong tonal signature.

The present inventors have recognised that some vehicles or other moving objects may emit acoustic signals with a strong component at a particular frequency, i.e. a strong tonal component. For instance it is realised that aircraft, especially propeller driven aircraft or rotary wing aircraft such as helicopters, may produce an acoustic signature with a relatively strong tonal component. When such a vehicle moves relative to the sensing fibre of the DAS sensor this can lead to a Doppler shift in the acoustic signal detected by the DAS sensor. The sensor apparatus of the present invention therefore analyses the signals from the sensing portions of optical fibre to detect characteristics of a Doppler shift and thus detect a moving object.

The characteristic of a Doppler shift may be a change in the frequency of detected signal at a particular sensing portion of optical fibre over time. It will be appreciated that the magnitude of the Doppler shift in a received acoustic signal at a first position at any time will depend on various parameters, one of which is relative velocity of the object in the straight line direction between the first position and the object. Unless the object is moving in a straight line directly towards, or away from, the first position the magnitude of the Doppler shift will therefore change over time as the object moves. Thus the processor may be arranged to detect a change in frequency of the detected signal over time. It will be appreciated that, assuming the object moves at roughly constant speed and direction, the change in magnitude of Doppler shift and hence change in detected frequency, will be generally continuous. The change in frequency which is a characteristic of Doppler shift may therefore may discriminated from a sudden jump in frequency which may be due to a change in the operating conditions of the object, for example a change of engine gearing etc.

For an object moving in a relatively constant direction which is not directly towards or away from a given sensing location the frequency of the signal detected by a sensing portion will generally decrease, both as the object moves towards the sensing portion (as the component of positive Doppler shift in the detected signal decreases), and also as the object moves away from the sensing location (as the component of negative Doppler shift in the detected signal increases). The characteristic of the Doppler signal may therefore be a signal with a frequency that generally decreases.

The characteristic of Doppler shift may also be detection of signals of different frequency at different sensing portions of the optical fibre which are spatially separated. The relative velocity of the object as observed from one sensing portion of the optical fibre will in general be different to the relative velocity of the object as observed from another, spatially separated, sensing portion of fibre. Thus (unless the two sensing portions of optical fibre are aligned with the object heading directly towards both sensing portions) the amount of Doppler shift observed by each sensing portion of optical fibre will be different. The spread of the frequency observed across the various channels of the DAS sensor may therefore be used as a characteristic of a Doppler shift to detect a moving object.

The processor may additionally be configured to analyse the characteristic of a Doppler shift to detect the range and/or location of the object relative to the sensing fibre or bearing to the object.

As mentioned above if an object, emitting a signal at a given constant frequency, which will be referred to as the true frequency, travels at a constant speed in a relatively constant direction past a fixed first location (without travelling directly through said first location) the frequency of any acoustic signal received at that first location from the object will gradual decrease. Initially the frequency detected at the first location will be higher than the true frequency as the object is travelling generally towards the first location. As the object gets closer to the first location the frequency will drop. The rate at which the frequency of the received signals drops will increase until the received signals correspond to the position of closest approach of the object to the first location. After this time, as the object subsequently moves away from the first sensing location, the frequency received at the first location will continue to drop but the rate of change of frequency will start to reduce.

Thus were a sensing portion of the optical fibre to detect an narrow band acoustic signal from a moving object travelling past that sensing portion, the acoustic signal detected would have a frequency that decreases over time, with a rate of change of frequency that increases to a maximum value and then decreases. The maximum rate of change in frequency will correspond to the signals emitted as the object passes the position of closest approach to the sensing portion of fibre. Thus, for each sensing portion of optical fibre, the time at which a maximum occurs in the rate of frequency change of detected signal indicates the time of receipt of signals corresponding to the position of closest approach of the object to the sensing portion.

Further, as will be explained in more detail later, the value of the maximum rate of change of frequency from each of a plurality of sensing portions of fibre will depend on how close the object came to each of those sensing portion, with the sensing portion that the object came closest to exhibiting the highest rate of change.

The processor may therefore analyse the measurement signals from a plurality of sensing portions to determine the time at which the maximum rate of change of frequency occurs for each sensing portion. The processor may also determine the value of the maximum rate of change of frequency. This can then be used to determine information about the heading of the object with respect to the optical fibre and/or the distance of the object from the fibre. The sensing portion for which the measurement signal exhibits the greatest rate of change of frequency of any sensing portion may be identified the sensing portion that the object passes closest to. The relative times at which the signals from the other sensing portions exhibit the greatest rate of change of frequency can be used to identify the relative motion of the object. In other words by plotting the times at which each sensing portion detects signals from the point of closest approach of that object, the movement of the object along the fibre can be tracked.

For received signals that correspond to the position of closest approach, i.e. those signals emitted when the object was at the position of closest approach, there will be no observed Doppler shift and the received signal will be at the true frequency. Thus detecting the frequency of the signal at the point of maximum rate of change can provide the true frequency of the measured signal. From a knowledge of the true frequency of the emitted signal, and the amount of Doppler shift, the relative velocity of the object can be determined.

Further by determining the maximum rate of change of frequency for the sensing portions the distance of closest approach can be determined. As will be explained in more detail later the rate of change of frequency will depend on the distance of the object from the sensing portion and the velocity of the object. By measuring the maximum rate of change of frequency of the signal the distance of closest approach can therefore be determined. Thus the processor can give an indication of the lateral offset of the object from the sensing fibre. The measurement signals from a plurality of spatially separated sensing portions of optical fibre may therefore be analysed to determine, for each signal, the maximum rate of change of the frequency as detected for that sensing portion. The distance of the object from the sensing portion in each instance can then determined and used to plot the movement of the object.

The processing described above relies on the assumption that the object is moving in a relatively constant manner, i.e. with a relatively constant speed and direction. In many applications this assumption may be valid, especially in a relatively short time window, for instance centred around the time at which signals from the closest approach of the object to the fibre are received. The processor may therefore analyse the signals from the various sensing portions to detect a maximum rate of change of frequency and the time at which it occurs and then look at the returns from other sensing portions within a predefined time window. During this time window the motion of the object may be assumed to be constant.

Additionally or alternatively the overall characteristics of the signals from the various sensing portions may be analysed to detect characteristics associated with a change in motion. As mentioned above at any instant the amount of Doppler shift experienced at any given sensing portion will depend on the current trajectory of the object with respect to that sensing portion. Thus if the object changes direction the sensing portion that exhibits the maximum frequency (for an object moving towards the fibre) or minimum frequency (for an object moving away from the fibre) may change.

Speed changes may additionally be detectable by a change in the true frequency of the emitted sound. For instance a speed increase may be accompanied by an increase in the frequency of the emitted signal, for example as an engine revs faster. This may be detecting a frequency increase that effects all channels at roughly the same time (allowing for propagation delays).

The processing may be applied in real, or near real time, and/or the data acquired during a period when a moving object was detected could be stored for later analysis. Thus detection of a characteristic of a Doppler shift could be used to provide an alert that a moving object has been detected. Following such an alert the data from the relevant sensing portions may be recorded for subsequent analysis to determine the actual movement of the object.

In order to detect the characteristic of a Doppler shift the processor may be arranged to perform spectral analysis on the measurement signal from the sensing portions of optical. The spectral analysis may comprise applying a Fourier transform to the measurement signal and then detecting any strong frequency component. The processor may apply a narrow band fast Fourier Transform (FFT) to the sensor data on each channel. In some embodiments, in order to aid in initial detection of a tonal signature, a number (for example around ten, but not limited to ten) of FFTs may be summed together from adjacent channels to increase the SNR. The summing average may be rolled across all channels and a tonal detector may be applied to the summed average in a band of interest (for instance 100-300 Hz). An alert on a strong tonal component may then be detected. Alternatively the data from the FFT for each channel may be directly analysed by a tonal detector. Once a tonal component is detected the frequency of the tonal component in a plurality of different channels may be analysed as discussed above.

Whilst, for a fibre arranged in a linear arrangement, the processing described above can be used to determine the sensing portion of the fibre that the object passes closest to, the distance of closest approach and the relative motion of the object along the fibre and the lateral offset from the fibre, the lateral offset will have a positional ambiguity. That is for a fibre arranged to lie on a north-south line for example, the position at which an object crosses the fibre, the motion in the north or south direction and the lateral offset of the object from the fibre over time may all be determined—however without additional information it may not be possible to tell whether the object was travelling east-to-west or west-to-east.

In some implementations this may not be an issue. Any objects travelling in one direction over the border or perimeter may be known about and thus any detection of an unknown object is likely to be an object travelling in the other direction. However in other applications there may be a need to resolve this positional ambiguity. Thus in some arrangements other sensors may be used to generally determine which side of the fibre an object is on. For example a second fibre could be arranged alongside, but spatially separated (in a transverse direction) from, the first fibre to allow DAS sensing on both fibres. The time of arrival of a signal at each fibre would then indicate the direction of origin of the acoustic source. The second fibre could be interrogated by a different interrogator unit or in some embodiments a single interrogator unit could be multiplexed between the two (or more) sensing fibres. Other non-DAS sensors could also be used, for example point microphones or the like arranged spatially separated from the line of the sensing fibre. Such additional sensors may be arranged to so as to allow be more sensitive on one side of the fibre than the other. For instance one or more directional microphones may be arranged to be more sensitive to sounds originating from one side of the fibre than another.

In some embodiments however the sensing fibre may be deployed such that any such directional ambiguity can be determined by appropriate processing. The sensing fibre could be arranged in a non-linear arrangement, for instance in a generally meandering layout or with sections coiled back on one another and time of arrival techniques or the like could be used to determine which side of the fibre the acoustic signals arrive from. Clearly the arrangement of the sensing fibre should be known in order to determine the spatial locations of the sensing portions of optical fibre and hence allow determination of the position of the moving object. This may be achieved by careful deployment of the sensing fibre and/or by calibrating the sensing fibre once it is deployed.

Conveniently, when monitoring a land border or perimeter, the sensing fibre is buried in the ground. Burying the fibre protects it from environmental effects such as wind and rain, ensures that the fibre, once deployed, stays in the same location and also can allow the sensing fibre to be covert. Fibre optic cables that are deployed above ground level will generally be visible, therefore making it relatively easy for the sensing fibres to be located and tampered with.

It is known that a buried fibre can be used to detect land vehicle or personnel on land but the present inventors have surprisingly found that a buried optical fibre may also be used to detect air vehicles and to do so reliably, and to provide information about the speed and/or heading and/or altitude of an aircraft. Where an aircraft crosses an optical fibre the distance of closest approach will occur when the aircraft is directly overhead and thus the measure of the distance of closest approach is a measure of altitude. As mentioned above prior art systems used to detect aircraft in a border monitoring type application have required the use of fibre optic cables located above ground and have purely detected a disturbance and indicated that an aircraft may be somewhere in the vicinity.

The optic fibre may be buried underground at a depth of around 0.5 m, and the system may be able to detect aircraft at an altitude of around 300 m. Alternatively the fibre may be buried within a structure, for instance as part of a concrete structure such as part of a border wall or foundations.

It should be noted that embodiments of the sensor of the present apparatus look for the rate of maximum change in the frequency signal and thus process signals corresponding to the position of closest approach of the object. Such an embodiment therefore inherently uses those detected signals which are likely to have the highest intensity and best signal to noise ratio by virtue of having been emitted when the object was relatively close. It would be possible to determine an amount of Doppler shift by processing signals from when the object is first detected and just before contact with the object is lost to determine the maximum observable Doppler shift. Such signals will however inherently by relative low intensity and have a low signal to noise ratio. This would be difficult in any case but especially when using a buried fibre to detect an aircraft.

In some embodiments the system may be configured to detect and output parameters associated with aircraft, for example the system may be able to classify the type of aircraft by analysing the true frequency detected. When a signal characteristic of a aircraft is detected the sensor may be arranged to generate an alert or alarm and the position of the aircraft may be highlighted on a display. In an embodiment, the system may be arranged to measure Doppler as described above and estimate speed. The frequency signal may also be analysed to estimate engine gearing.

It will be appreciated that the processing described above relies on detection of an acoustic signal with a distinct narrow band component, i.e. a strong tonal component. It has been appreciated that some aircraft do produce an acoustic signal with such a tonal component. Some land vehicles may also produce such a component. For instance trains may produce a tonal component, which may be related to the speed of the train. The sensor of this aspect of the invention may be advantageously be deployed to monitor the movement of trains, or more generally land vehicles moving along a route. In this instance the sensing fibre may be arranged to run generally alongside a section of track or road that it is wished to monitor. In general, with an optical fibre laid along a section of track or road it may be possible to generally track motion of a vehicle by simply detecting the sensing portions of fibre which are showing signs of a relatively intense acoustic signal being received at that section of fibre. In other words by just generally detecting the overall noise created by passage of a train for example it should be possible to determine where along the length of the sensing fibre the train is located. However if there are multiple tracks running alongside one another, or multiple roads or a road with multiple lanes, just generally detecting an acoustic disturbance at one section of sensing fibre will not provide any information as to the lateral offset of the vehicle, e.g. train, from the fibre. Hence it would not be possible to determine which track the train was on or which road a car say was travelling along.

Using the sensor of this aspect of the invention however, by detecting a tonal component in the acoustic signature which is emitted by the vehicle and processing the signature as described above an indication of the lateral offset of the moving object from the sensing fibre can be determined. This may therefore identify the relevant track or road that the vehicle is moving along.

The sensor of this aspect of the present invention is therefore particularly suited to the monitoring of trains moving along a track and the sensing fibre may be a fibre which is laid or buried alongside a section of track or tracks.

As mentioned, it has been recognised that some moving objects may naturally emit an acoustic signal with a strong tonal component when moving. In some applications however it may be possible to ensure that an object to be tracked emits a narrow band frequency. Thus in some applications an object may be provided with an acoustic transducer arranged to produce a narrow band acoustic output, at least during object motion. Thus in effect an object is provided with an acoustic source that, in use, produces an acoustic output at a predefined frequency. By ensuring that each object to be tracked is fitted with an acoustic source which broadcasts at a relatively narrow frequency it is ensured that a Doppler signal may be detected by a sensing fibre when that object moves. Further this allows a known true frequency to be used which can aid in detecting the appropriate signal. Where multiple objects are to be tracked the same true frequency could be used for each object or alternatively each object may be arranged to transmit at a different true frequency, thus detection of the true frequency will enable identification of the relevant object.

The present invention also relates to a method of distributed acoustic sensing. Thus in another aspect of the invention there is provided a method of distributed acoustic sensing comprising: interrogating an optical fibre with optical radiation and producing a measurement signal indicative of incident acoustic signals from each of a plurality of sensing portions of said optical fibre; and analysing said measurement signals to identify a signal characteristic of a Doppler shift so as to detect a moving object.

The method of this aspect of the invention offers all of the same advantages as described above with reference to the first aspect of the invention and may be used in all of the same embodiments.

The method may be used to provide monitoring of perimeter or border and the optical fibre may be deployed along the length of the border or perimeter. The fibre may be buried. The method may provide a method of detecting aircraft, in particular low flying, light aircraft, crossing said border using a buried optical fibre.

The method may also be used to provide tracking of land vehicles, and especially trains moving along a route such as a train track. The method can allow determination of the lateral offset of the vehicle from the sensing fibre and thus allow determination as to which of multiple tracks or roads the vehicle is travelling along.

The method may be employed to detect an acoustic signal from an acoustic transmitter located on the object. The object may be fitted with an acoustic transducer arranged to produce an acoustic output at a defined frequency.

Whilst in some embodiments the data analysis may be performed in the same general location as the data collection, in other embodiments the data analysis may be remote from the data collection. For example an interrogation unit may be arranged to interrogate an optical fibre and detect the backscattered radiation and then transmit data regarding the measurements to a remote data centre for analysis. Also whilst the method can usefully be employed with real time returns from a DAS sensor the data from the sensor could be stored for subsequent analysis. Thus in a further aspect of the invention there is provided a method of processing data acquired from a distributed acoustic sensor to detect moving objects comprising taking data comprising measurement signals indicative of incident acoustic signals from each of a plurality of sensing portions of a distributed acoustic sensor; and analysing said measurement signals to identify a signal characteristic of a Doppler shift so as to detect a moving object.

As mentioned above the present invention is particularly applicable to the detection of moving aircraft using a buried optical fibre. Thus in general, in another aspect of the invention there is provided a system for aircraft detection, comprising a fibre optic interrogator adapted to provide distributed acoustic sensing on a optic fibre along a border; a sampler arranged to sample a plurality of channels output from said interrogator simultaneously to provide acoustic data from a plurality of sensing portions of said fibre at each of a plurality of times; and a data analyser adapted to process said sampled data to detect aircraft near or passing over the border, wherein the optic fibre is buried along the border. In general the present invention relates to the use of an optical fibre distributed acoustic sensor comprising a buried optical fibre to detect movement of a powered aircraft.

In another aspect of the invention a method of detecting powered aircraft is provided, the method comprising interrogating a buried optical fibre with pulses of electromagnetic radiation to provide a distributed acoustic sensor having a plurality of sensing portions of fibre and analysing the signals from said sensing portions of fibre to detecting signals characteristic of a powered aircraft.

The invention may comprise any combination of the features and/or limitations referred to herein, except combinations of such features as are described as mutually exclusive.

The invention will now be described by way of example only with reference to the following drawings, of which:

FIG. 1 illustrates the basic components of a distributed acoustic sensing apparatus;

FIG. 2a shows a plan view of an object passing a sensing fibre and FIG. 2b shows a side elevation;

FIG. 3 illustrates the frequency signals that may be detected by sensing portions of the optical fibre during the object motion shown in FIG. 2;

FIG. 4 illustrates an object crossing a sensing fibre at an acute angle and the rate of change of frequency in various different sensing portions;

FIG. 5 shows three different example locations of an object moving toward or away from a sensing portion of optical fibre;

FIG. 6 shows the frequency spread of the detected signals across the length of the optical fibre for the three example locations shown in FIG. 5;

FIG. 7 illustrates three arrangements for resolving positional ambiguity;

FIG. 8 shows a waterfall plot of a DAS sensor detecting an aircraft; and

FIG. 9 shows an embodiment for monitoring movement of land vehicles.

FIG. 1 shows a schematic of a fibre optic distributed acoustic sensing (DAS) arrangement. A length of sensing fibre 104, which may be standard optic fibre such as used in telecommunication applications, is removably connected at one end to an interrogator 106. The output from interrogator 106 is passed to a signal processor 108 and optionally a user interface, which in practice may be realised by an appropriately specified PC. The sensing fibre can be many kilometers in length, and in this example is approximately 40 km long, and is deployed in an area to be monitored. In one embodiment the fibre may be deployed along a border or a perimeter to be monitored and may be buried in the ground along said border or perimeter.

DESCRIPTION OF THE DRAWINGS

In operation the interrogator 106 launches interrogating electromagnetic radiation, which may for example comprise a series of optical pulses having a selected frequency pattern, into the sensing fibre. The optical pulses may have a frequency pattern as described in GB patent publication GB 2,442,745, the contents of which are hereby incorporated by reference thereto. Note that as used herein the term "optical" is not restricted to the visible spectrum and optical radiation includes infrared radiation and ultraviolet radiation. Backscattering results in some fraction of the light input into the fibre being reflected back to the interrogator, where it is detected to provide an output signal which is representative of acoustic disturbances in the vicinity of the fibre. In one embodiment the detector is arranged to detect radiation which has been Rayleigh backscattered within said fibre, but other types of distributed acoustic sensor using other types of backscatter are known.

The interrogator may therefore comprises at least one laser and at least one optical modulator for repeatedly producing at least two optical pulses which are separated by a known optical frequency difference. The interrogator also comprises at least one photodetector arranged to detect radiation which is Rayleigh backscattered from the intrinsic scattering sites within the fibre.

Figure 4:
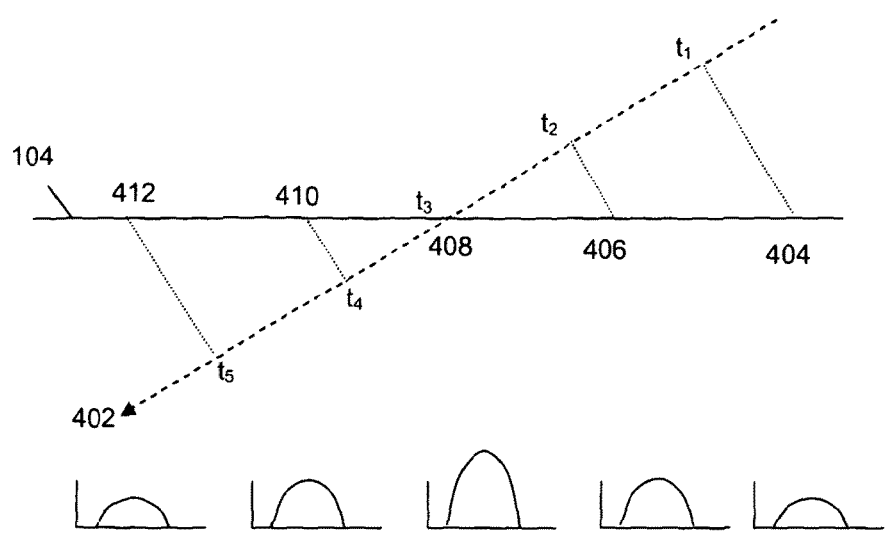

The signal from the photodetector is sampled and processed by a processor. The processor conveniently demodulates the returned signal, for example based on the frequency difference between the optical pulses. The phase of the backscattered light from various sections of the optical fibre can therefore be monitored. Any changes in the effective path length from a given section of fibre, such as would be due to incident pressure waves causing strain on the fibre, can therefore be detected.

DESCRIPTION OF THE INVENTION

While the interrogator 106 is shown in FIG. 1 as a single unit, the hardware may be divided into multiple units. For example, it may be divided into an interrogator box providing raw output data that may then be provided to a separate processor to provide the processing capability. The processor may include a sampler that is arranged to sample a plurality of channels output from said interrogator simultaneously to provide acoustic data from a plurality of contiguous portions of said fibre at each of a plurality of times. The processor may also include a data analyser adapted to process the sampled data to detect acoustic vibration events and output parameters associated with the detected events.

The form of the optical input and the method of detection allow a single continuous fibre to be spatially resolved into a plurality of discrete longitudinal sensing portions. That is the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution in the present example is approximately 10 m, resulting in the output of the interrogator taking the form of 4000 independent data channels.

In this way, the single sensing fibre can provide sensed data from effectively a multiplexed array of adjacent sensing portions of fibre, arranged in a path, which may be straight or curved depending on the application.

It has been proposed to use such a DAS sensor in border or perimeter monitoring applications. Buried fibres have been proposed for the detection of ground based vehicles and personnel and fibres located above ground have been proposed for detection of aircraft. In both situations however the DAS sensor effectively operates by detecting a disturbances in one or more sensing portions of the optical fibre and simply determines where along the length of the sensing fibre the disturbance is detected. Due to the relatively strong attenuation of acoustic signals through the ground the conventional monitoring method may be sufficient for detection of ground vehicles but for aircraft detection it will be difficult to determine exactly where the aircraft is located as the acoustic signal will travel through the air over a relatively wide distance. Further the requirement for an above ground fibre also means that such fibre may be effected by environmental conditions such as wind and rain and can not be easily made covert.

The present inventors have realised that some moving objects, and especially aircraft and in particular light aircraft, will tend to produce an acoustic signal with a relatively strong, narrow frequency band component, i.e. strong tonal component. This strong tonal component may be used to detect an aircraft, even using a buried optical fibre. An aircraft can be distinguished from a ground based source by the number of channels that detect the object. In other words, the DAS detector relies on the fact that aircraft, for example microlights and helicopters emit a strong tonal over multiple channels of the sensing fibre. Few ground based noise sources can push a (relatively) high frequency though the ground very far, so airborne noise sources are unique in lighting up large sections of fibre.

In a basic detection method, to detect an aircraft flying at an altitude of around 300 m above the buried optic fibre, a narrow band FFT may be applied to the sensor data on each channel by the system. A number (around ten, but not limited to ten) of FFTs may be summed together from adjacent channels to increase the SNR. The summing average may be rolled across all channels. A tonal detector may be applied to the summed average in the band of interest (100-300 Hz) and an alert on a signal characteristic of a aircraft may be provided and the position of the aircraft may be highlighted a display.

Therefore, in a basic detection method to detect an aircraft it is simply required that a tonal to exist for a long enough period across a minimum number of channels. Once a tonal is detected, a large FFT is performed on each channel. Then, the FFT data within a channel is averaged over many seconds. This causes the tonal to become more apparent than the background noise, which can be reduced. The peak within the FFT is then found and it is ensured that the width of the peak is narrow, thereby representing a tonal. If the same tonal is present in a minimum set of adjacent channels then the DAS system outputs a detection event.

In additional however embodiments of the present invention analyse the measurement signals from a plurality of sensing portions of optical fibre to detect a characteristic of a Doppler shift to detect a moving object. Further by analysing the spread and/or change of frequency across a number of different sensing portions of optical fibre the location and/or speed of the aircraft can be detected. The detection of aircraft will be discussed below but the principles are applicable to detection of any object which emits an acoustic signal with a strong tonal component (although, as mentioned, signals from ground based sources may effect fewer sensing portions of optical fibre).

The skilled person will appreciate that as an object, which emits an acoustic signal at a particular frequency, moves with respect to a location the well known Doppler effect will result in a change in the detected frequency at that location.

In general the change in frequency, $\Delta f$, depends on relative velocity of the object away towards the observing location, $v_r$, i.e.

$$\Delta f = v_r \cdot f_0 / c \qquad \text{(Eqn. 1)}$$

where $f_0$ is the true frequency of the emitted sound and c is speed of sound.

For a DAS sensor the location of any individual sensing portion is fixed. However as the object moves, unless the object is heading directly towards the sensing location (which is unlikely when the sensing portion is part of a buried optical fibre and the moving object is an aircraft), the relative velocity of the object towards the location of the sensing portion will change.

For example, FIGS. 2a and 2b, illustrate the trajectory 202 of an aircraft flying at a constant altitude, speed and heading across the sensing fibre 104. In this example the trajectory of the aircraft is such that its horizontal trajectory is perpendicular to the sensing fibre.

FIG. 2a shows a plan view and FIG. 2b a side elevation as the aircraft crossed directly overhead a sensing portion 204 of the fibre 104. In this example the fibre is buried in the ground 206. As the aircraft approaches the fibre it is moving towards the fibre and thus the relative velocity of the aircraft towards the sensing portion of fibre is positive, hence there is a positive Doppler shift and the frequency received at the sensing portion 204 is greater than $f_0$. However it can be seen that the magnitude of the relative velocity towards of the aircraft towards the sensing portion 204 will change over time. At a time $t_1$, when the aircraft is still heading toward the fibre 104, the relative velocity of the aircraft to the sensing portion 202 will be:

$$v_r = V \cos \theta_1 \qquad \text{(Eqn. 2)}$$

where $\theta_1$ is, as shown, the angle between the heading of the aircraft and the direction from the aircraft to the sensing portion and V is the ground speed of the aircraft. It will be clear that when the aircraft is further away the value of $\theta_1$ will be lower and thus the value of $v_r$, and hence the value of the observed Doppler shift will be higher. Thus as the aircraft approaches the fibre 104 the detected frequency will drop, as shown by curve 302 in FIG. 3. However as long as the aircraft is still approaching the point of closest approach to the fibre it is still moving towards the fibre and the detected frequency will thus be higher the true frequency $f_0$.

At time $t_2$ the aircraft is directly overhead the sensing portion 204 of fibre 104. At this point the aircraft is travelling in a direction tangential to the fibre and the relative velocity of the aircraft toward the fibre is zero Thus at this point the acoustic signals emitted from the aircraft will not experience any Doppler effect during propagation to the sensing portion 204 and the sensing portion will therefore receive a signal at the true frequency $f_0$.

As the aircraft passes over the fibre 104 and starts to travel away from the fibre the relative velocity of the aircraft to the fibre becomes negative and thus the detected frequency will drop still further.

The same general analysis also holds true for a sensing portion 208 which is spatially separated from sensing portion 204 and thus also spatially separated from the point at which the aircraft crosses the optical fibre. As the aircraft approaches sensing portion 208 a positive Doppler shift will be experienced in the received signals. However as sensing portion 208 is offset from the horizontal heading of the aircraft the relative velocity in the direction between the aircraft and sensing portion 208 will be lower than that for sensing portion 204 (for any given point on the trajectory 202 the angle $\theta$ to sensing portion 208 will be greater than that to sensing portion 204). Thus the amount of Doppler shift experienced in the received signals will be lower. The aircraft will however still be heading toward sensing portion 208 until the point of closest approach is reached which, in this example, occurs when the aircraft is directly overhead the fibre, i.e. at $t_2$. At this point the aircraft will be travelling tangentially to sensing portion 208 and thus the relative velocity toward sensing portion 208 will be zero. Thus signals emitted from the aircraft at this point will also be received by sensing portion 208 with no Doppler shift. As the aircraft crossed the fibre and moves away the amount of negative Doppler shift will increase and thus the detected frequency will drop further.

Curve 304 in FIG. 3 represents the detected frequency at sensing portion 208 as the aircraft crosses the fibre (adjusted for propagation delays in the time taken for the signals emitted at time $t_2$ say to reach sensing portions 204 and 208 respectively). It can be seen that sensing portion 208 will detect the same generally pattern of frequency drop as sensing portion 204 but the amount and rate of frequency change at sensing portion 208 will be reduced as compared to that experienced at sensing portion 204.

It can therefore be seen that a sensing portion of optical fibre detecting a narrow band acoustic signal from an object crossing the fibre will exhibit a detected signal with a frequency that continually decreases as the objects moves (for a steady course heading and speed).

Thus the signal processor 108 of a DAS sensor of the present invention is arranged to apply spectral analysis to the acoustic signals detected by the sensing portions of the optical fibre 104. The signal processor may apply a Fourier transform to the measurement signals from each of a plurality of sensing portions to detect a strong tonal component that gradually decreases as discussed above.

Further the rate of change of frequency in the detected signals can be used to determine information about the movement of the aircraft to the fibre 104. As shown by curves 302 and 304 in FIG. 3 the rate of change of frequency increases as the aircraft approaches the point of closest approach, in this case directly overhead sensing portion 204. Once the aircraft has passed this position of closest approach the rate of change starts to decrease. Thus the time at which the rate of change of frequency is at a maximum can be used to determine the time at which signals were received from the closest approach of the aircraft to the relevant sensing portion.

As will be appreciated from equations (1) and (2) above the change of frequency with time, $\Delta f(t)$, will be:

$$\Delta f(t) = v_r(t) \cdot f_0/c \qquad \text{Eqn. (3)}$$

The change in relative velocity with time, $v_r(t)$, can be expressed in terms of the change in angle between the heading of the aircraft and the direction to the sensing portion with time, $\theta(t)$, i.e. $v_r(t)$ is equal to $V \cdot \cos \theta(t)$.

It will be appreciated from FIG. 2a that if t is defined as zero at the point of closest approach, and positive before the point of closest approach is reached, then:

$$\cos \theta(t) = V \cdot t / (V^2 t^2 + d_0^2)^{1/2} \qquad \text{Eqn. (4)}$$

with $V \cdot t$ representing the horizontal distance of the aircraft from the fibre, and $d_0$ being the distance of closest approach, which, for sensing portion 204 where the aircraft crosses directly overhead, represents the altitude of the aircraft.

Based on equations (3) and (4) it can be seen that $$\Delta f(t) = [V^2 \cdot t / (V^2 t^2 + d_0^2)^{1/2}] \cdot f_0/c \qquad \text{Eqn. (5)}$$

It can easily be shown that the rate of change of frequency is greatest at a time equal to t=0, i.e. at the point of closest approach. Further the rate of change depends upon the distance of closest approach with a shorter distance of closest approach leading to a greater maximum rate of change. Thus as shown in FIG. 3 the maximum rate of change of frequency occurs in both curves 302 and 304 when the aircraft was at the point of closest approach. However curve 302, from sensing portion 204, shows a steeper gradient and thus faster rate of change than curve 304 from sensing portion 208.

In the example shown in FIG. 2 the aircraft flies in a horizontal direction which is perpendicular to the direction in which the fibre extends. In this case the aircraft will be at its point of closest approach to each sensing portion of the fibre at the same time, when it is directly overhead the fibre, i.e. above sensing portion 204.

Each sensing portion that detects the tonal acoustic signal from the aircraft will therefore exhibit a change in frequency of the detected signal over time, with the greatest absolute frequency change and the greatest rate of change of frequency being exhibited by the sensing portion that the aircraft passes directly over. A sensing portion which is a few hundred meters away will exhibit a relatively lesser absolute frequency change and also the maximum rate of change of frequency will be lower. By analysing the absolute value of frequency change and/or the rate of change of frequency of the detected signals from a plurality of sensing portions it is therefore possible to determine which sensing portion was closest to the object as it passed the sensing fibre.

It is also possible to determine, for each sensing portion, the time at which the signals corresponding to the point of closest approach were received. For the example described above the point at which the object is actually at the position of closest approach to a sensing portion will be the same for all sensing portions. However the propagation time from the object to the relevant sensing portions of fibre will depend on the relative distance. Thus the signal emitted at this point will be received at the sensing portion 204 directly below the object at a first time and then slightly later at sensing portion 208. Thus in the signals detected by the relevant sensing portions the maximum rate of change of frequency in sensing portion 208 may occur slightly later than in sensing portion 204. However if one were to look at a third sensing portion (not separately illustrated) which is spatially separated from sensing portion 204 by the same distance as sensing portion 208, but on the other side of the fibre, this third sensing portion would also exhibit a maximum rate of change of frequency as it detects signals from the aircraft passing overhead. As this third sensing portion is spaced equidistant from the point of crossing as sensing portion 208 the propagation delay will be the same and thus both sensing portion 208 and the third sensing portion will receive the signals at the same time. If two spatially separate portions of optical fibre experience the maximum rate of change in frequency at the same time as one another the aircraft must be travelling in a direction which is perpendicular to a plan containing said sensing portions. In the application to border monitoring one can assume the general direction of travel will in a horizontal direction and hence the aircraft can be taken to be moving in a direction perpendicular to the vertical plane containing the sensing portions.

If the aircraft had a different trajectory then it would reach closest approach to different parts of the optical fibre at different times, as illustrated in FIG. 4. FIG. 4 shows a sensing fibre 104 and the trajectory 402 of an aircraft passing the fibre. In this case the aircraft approaches the fibre at an acute angle in the horizontal plane. It will be clear that the aircraft will be at a point of closest approach to a sensing portion at location 404 at a first time $t_1$, and later at a time $t_2$ will reach closest approach to sensing portion 406. At time $t_3$ the aircraft crosses the fibre over sensing portion 408 and thus makes closest approach to sensing portion 408. Only after the aircraft has crossed the fibre does it reach closest approach to sensing portions 410 and 412 and times $t_4$ and $t_5$ respectively.

By determining the time at which the point of closest approach occurs for multiple sensing portions of fibre the passage of the aircraft along the fibre can thus be determined. As mentioned above the position of closest approach can be determined by looking at the rate of change of frequency in the signal from the sensing portions and identifying the time of maximum rate of change of frequency. FIG. 4 illustrates graphs of the rates of change of frequency for the various sensing portions in the respective periods. As mentioned above the overall value of the rate of change of frequency will depend on the distance of closest approach. Thus by analysing the actual value of the maximum rate of change of frequency from the various sensing portions the sensing portion that the aircraft came closest to can be identified. In border monitoring applications this may inherently mean the position at which the aircraft crossed the fibre (depending on the fibre alignment).

Further, it can be seen from equation (5) above that the rate of change of frequency with time depends on the distance of closest approach. By looking at the value of maximum rate of change of frequency for a number of sensing portions it is possible to determine a value for the distance of closest approach to those sensing portions. Once the distance of the closest approach to a plurality of sensing portions has been established the trajectory of the aircraft relative to the sensing fibre can be determined.

Figure 5:
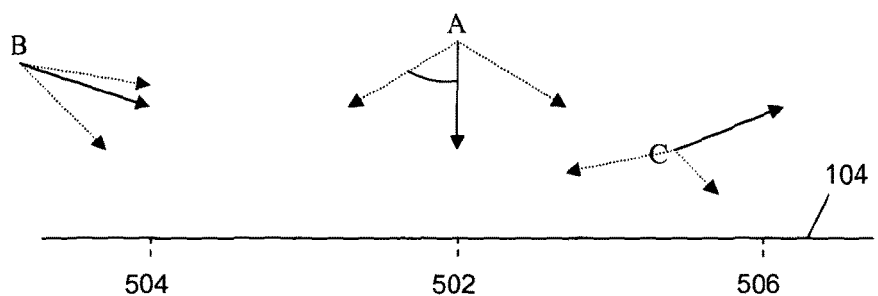

As well as using the rate of change of frequency as an indication of the time of closest approach of an object to a sensing portion of fibre it is also possible to use the frequency characteristics along the length of the sensing fibre. From the discussion above it can be seen that the maximum Doppler shift experienced by any sensing portion of the fibre will be that sensing portion that, on the current trajectory, will be or would have been the sensing portion that the object would pass closest to, i.e. in equation 2 where θ is closest to 0° or 180°. Thus FIG. 5 illustrates, in plan view, three spatially separated sensing portions 502, 504, and 506 arranged along a sensing fibre 104, with sensing portions 504 and 506 being arranged equally spaced about sensing portion 502. Now consider an object at position A and heading towards the fibre in the direction shown by the solid arrow so that it would cross the fibre at the position of sensing portion 502. The dotted arrows illustrate the direction signals from this locations would travel in to reach sensing portions 504 and 506.

As the object is moving towards the fibre the signal received at each of the sensing portions will have a positive Doppler shift. The maximum observed Doppler shift will occur at sensing portion 502 and the Doppler shift will reduce as one moves along the fibre. In this example the object is on a heading which in, the horizontal plane is perpendicular to the fibre 104. Thus the observed Doppler shift will be symmetrical about the location of sensing portion 502. The top plot in FIG. 6 therefore illustrates the frequency detected by a sensing portion as a function of distance along the sensing fibre for example A.

Now consider an object at location B but again moving toward the fibre so as to cross the fibre at sensing portion 502 as illustrated by the solid arrow. The dotted arrows again show the direction to the sensing portions 504 and 506. With an object on this heading it can be seen that the angles to sensing portions 504 and 506 are no longer symmetrical. Further, at this position, which is further from sensing portion 502 that position A, the overall spread of angles is reduced. Thus although the sensing portion 502 would again experience the highest amount of positive Doppler shift in the this arranged the spread of detected frequencies through the sensing fibre would not be symmetrical as illustrated in the middle plot of FIG. 6.

Figure 6:
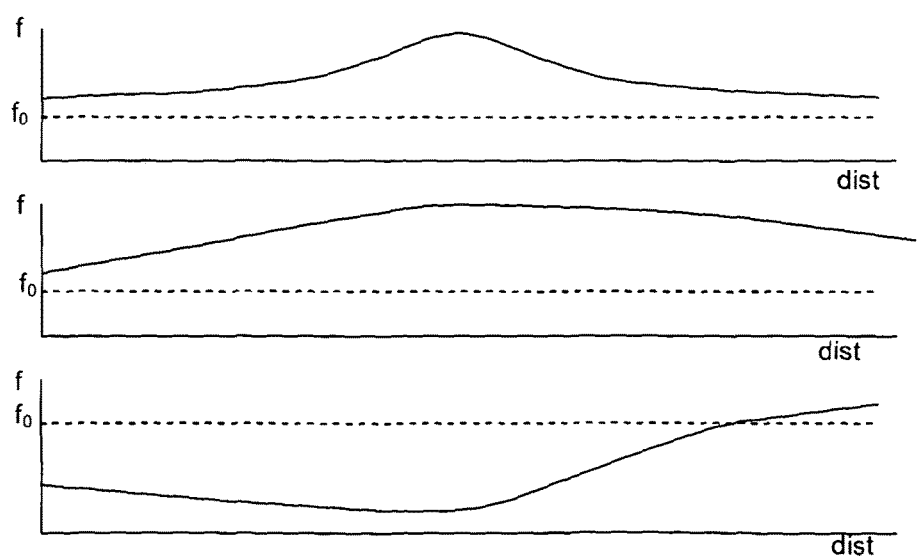

Finally consider an object at location C which is moving away from the fibre along a trajectory which means it is heading away from section 502 in the direction shown by the solid arrow. In this case section 502 will show the greatest negative Doppler shift. It can also be seen that at location C the object has not yet reached the point of closest approach to sensing portion 506 and thus at this sensing portion a positive Doppler shift will be experienced. The lower plot of FIG. 6 illustrates an example frequency distribution across the sensing portions of the optical fibre 104.

Thus the instantaneous frequency distribution of the detected signals along the optical fibre can be used to determine information about the current heading of an object. This can also be used to determine is an object changes directions.

All of the embodiments discussed above have so far discussed use of a generally straight fibre. If the fibre were deployed in a generally straight arrangement then there may be some positional ambiguity in the detection of the moving object. For instance referring to FIGS. 2a and 2b exactly the same traces as shown in FIG. 3 would be detected if the object was moving in the opposite direction to that shown. Referring to FIG. 4 the same timings and frequency changes would also be detected were an object to travel on a trajectory that was mirrored about the axis of the fibre. thus in the absence of additional information with a straight fibre it is not possible to determine in which direction the object crossed the fibre.

Figure 7:
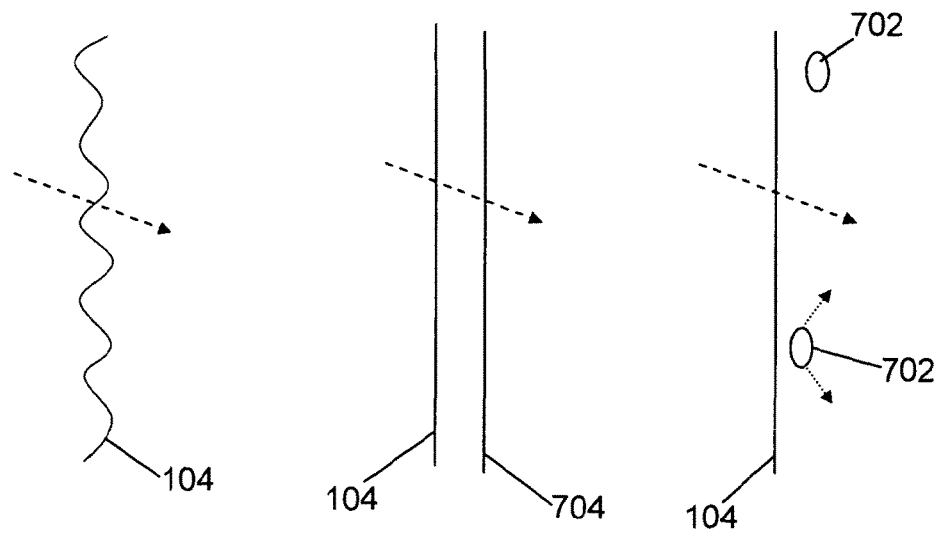

In some embodiments therefore the fibre or additional sensors may be arranged such that such positional ambiguity can be resolved. FIG. 7 shows three example embodiments. In a first embodiment the fibre 104 may be arranged in a non-straight manner, for instance a meandering pattern as shown or a curved pattern. As an object approaches the fibre the time of arrival of signals can be used to determine which side of the fibre the object is on, or the time of closest approach to the different sections of the fibre could be determined as set out above and used to resolve the ambiguity. In another embodiment an additional length of fibre 704 is used. This could be a different part of the same fibre or a separate optical fibre could be used. If a separate optical fibre is used it could be interrogated by the same interrogator unit 106 is an multiplexed arranged or by a different interrogator. In a third embodiment additional sensors 702 are used to detect the object. The sensor could be preferentially sensitive to one side of the fibre only, e.g. directional microphones.

Figure 8:
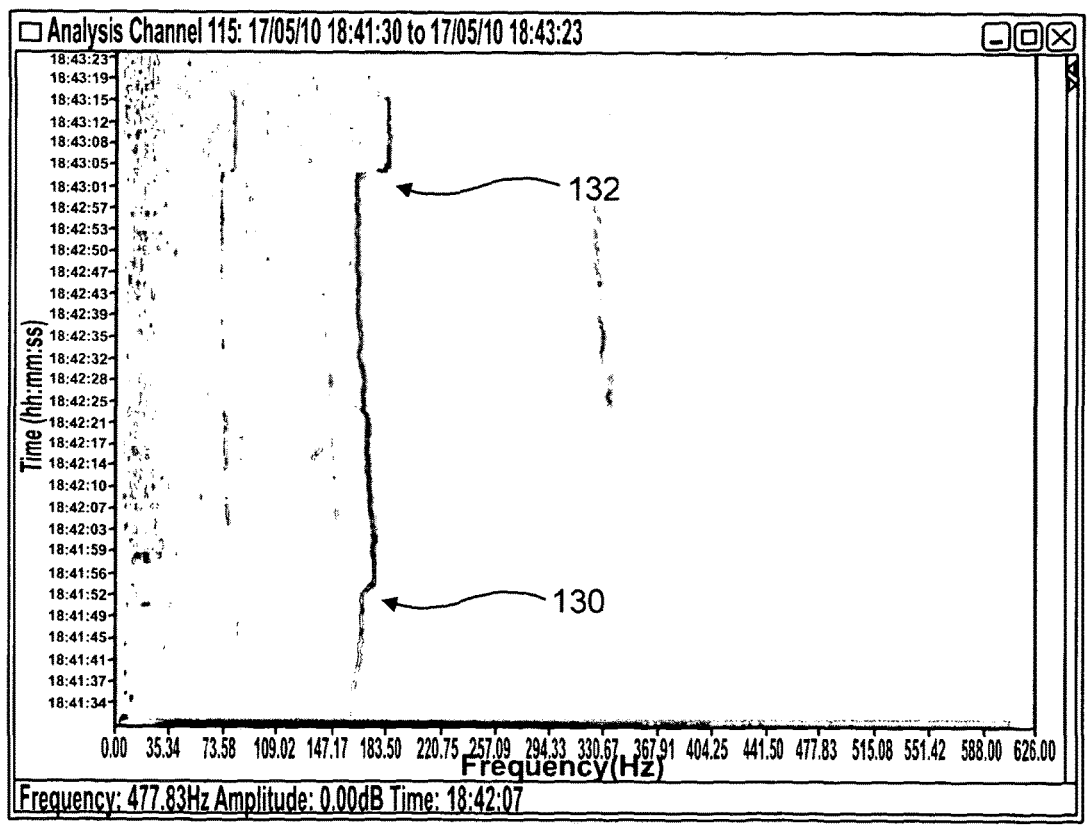

FIG. 8 is a waterfall graph showing the output of the interrogator of FIG. 1 when sued to detect aircraft. In FIG. 8, frequency is displayed on the x axis and time is displayed on the y axis. As can be seen from FIG. 8, a first event 130 occurs at a first time. As can be seen the detected frequency increases to a maximum and then decays back to the background level. No significant processing was applied to this detection but this shows that aircraft can be detected by a buried DAS fibre.

As can be seen from FIG. 8, as the frequency of the engine noise can be detected, it may also be possible to apply other analysis to the detected signals to identify estimate engine speed and engine gearing and/or identify a type of engine. Demodulated noise processing can be used to extract the number of cylinders, i.e. whether or not it's 2 stroke or 4 stroke etc. Upon detection of the aircraft, an appropriate response can be automatically triggered, such as training surveillance cameras to the detected position of the aircraft, or contacting the authorities with the detected location of the aircraft.

Although the term aircraft is used throughout the above description, the term aircraft should be understood to mean any powered vehicle capable of flying, such as aeroplanes, helicopters, microlights (ultralights) and powered paragliders (paramotors), for example.

Whilst the embodiments of the present invention are particular suitable for detecting aircraft the general methods are applicable to detection of any moving objects that emit a strong narrow frequency band signal. In another example the DAS sensor according to embodiments of the present invention is deployed to monitor trains.

Figure 9:
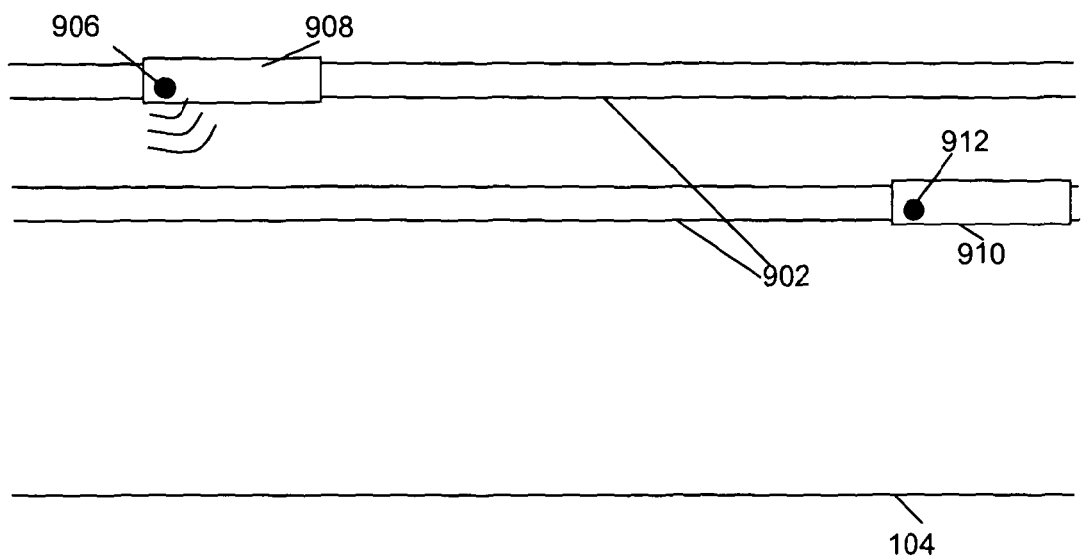

As shown in FIG. 9 an optical fibre 104 may be deployed alongside one or more train tracks 902, although in other embodiments the fibre may be deployed alongside different roads to detect road traffic. The fibre can be connected to an interrogator unit as discussed above and used to provide sensing as trains 908, 910 pass on the tracks.

Conventional DAS sensing can be used to generally determine the location of a train on the tracks 902 by detecting where along the fibre is experiencing a disturbance. However using conventional DAS sensing in an embodiment such as shown in FIG. 9 it would not be possible to determine which track a train was travelling along. However according to embodiments of the present invention the relative distance can be determined by comparing the rate of change of frequency as the train passes by a sensing portion.

Whilst trains may well produce an inherent acoustic signal with a strong tonal component it is possible to ensure a strong tonal signature by fitting the trains 908, 910 with acoustic transducers configured to emit a particular frequencies. This will ensure that there is a strong tonal component that can be detected and processed using the Doppler processing techniques discussed above. Each train could be fitted with a transducer that transmits the same predetermined frequency or transducer 906 could be arranged to emit a different frequency to transducer 912.

It should be noted that for the processing as discussed above the distance between the optical fibre and the position of closest approach of the object should be at least equal to the spatial length of the sensing portions of fibre in the environment. If the object passed very close to the optical fibre then the sensing portion may detect signals with both positive and negative Doppler shift in the same sensing portion. For detecting aircraft a sensing portion length of 10 m is acceptable as the aircraft will typically be tens of meters above the ground at least. For other applications the deployment of the fibre and choice of spatial resolution may be based on the likely distance of closest approach.

Whilst endeavouring in the foregoing specification to draw attention to draw attention to those features of the invention believed to be of particular importance, it should be understood that the applicant claims protection in respect of any patentable feature or combination of features hereinbefore referred to and/or shown in the drawings whether or not particular emphasis has been placed thereon.

The invention claimed is:

1. A distributed acoustic sensor apparatus comprising:
   an interrogator unit for, in use, interrogating an optical fibre with optical radiation and producing a measurement signal indicative of incident acoustic signals from each of a plurality of sensing portions of said optical fibre; and
   a processor configured to analyse said measurement signals to identify a signal characteristic of a Doppler shift so as to detect a moving object wherein the characteristic of a Doppler shift comprises a change in frequency over time of an acoustic signal detected at a particular sensing portion of the optical fiber and wherein the processor is configured to analyze the measurement signals from a plurality of sensing portions to determine a rate of change of frequency of a detected acoustic signal and to determine the time at which the maximum rate of change of frequency occurs for each sensing portion wherein in response to identifying the signal characteristic of the Doppler shift to detect the moving object, providing an alert that the moving object has been detected.

2. An apparatus as claimed in claim 1 wherein said characteristic of a Doppler shift comprises a decrease in the frequency of detected signal at a particular sensing portion of optical fibre over time.

3. An apparatus as claimed in claim 1 wherein said characteristic of a Doppler shift comprises detection of signals of different frequency at different sensing portions of the optical fibre which are spatially separated.

4. An apparatus as claimed in claim 1 wherein the processor is configured to analyse the characteristic of a Doppler shift to detect the range and/or location of the object relative to the sensing fibre.

5. An apparatus as claimed in claim 1 wherein the time at which the maximum rate of change of frequency occurs for each sensing portion is used to determine the time at which the object was closest to that sensing portion.

6. An apparatus as claimed in claim 5 wherein the processor is adapted to use the times at which each sensing portion detects signals from the point of closest approach of that object to track the movement of the object along the fibre.

7. An apparatus as claimed in claim 1 wherein the processor is configured to determine the value of the maximum rate of change of frequency for each of a plurality of sensing portions.

8. An apparatus as claimed in claim 7 wherein the processor is configured to determine the sensing portion for which the measurement signal has the greatest value of maximum rate of change of frequency out of any sensing portion and to identify such sensing portion as the sensing portion which the object passed closest to.

9. An apparatus as claimed in claim 1 wherein the processor is configured identify the frequency of the measurement signal corresponds to the maximum value of rate of change of frequency as the true frequency of the acoustic signal emitted by the object.

10. An apparatus as claimed in claim 9 wherein the processor is configured to use the true frequency to determine the relative velocity of the object.

11. An apparatus as claimed in claim 1 wherein the processor is configured to determine the distance of closest approach of the object to a sensing portion by analysing the maximum rate of change of frequency.

12. An apparatus as claimed in claim 1 wherein, having detected an object, the processor is configured to analyse the characteristics of the signals from a plurality of sensing portions to detect characteristics associated with a change in motion.

13. An apparatus as claimed in claim 12 wherein said characteristics associated with a change in motion comprise a change in location of the sensing portion that exhibits a local maximum or minimum in frequency of the measurement signal.

14. An apparatus as claimed in claim 12 wherein said characteristics associated with a change in motion comprise a sudden increase or decrease in frequency of the measurement signal from several sensing portions.

15. An apparatus as claimed in claim 1 wherein the processor is configured to analyse the time of arrival of acoustic signals emitted from the object at different locations of the optical fibre and/or distance of closest approach of an object to different locations of the optical fibre to avoid any positional ambiguity in the location of the object.

16. An apparatus as claimed in claim 1 wherein the processor is configured to receive data from at least one other sensor to avoid any positional ambiguity in the location of the object.

17. An apparatus as claimed in claim 1 wherein the processor is configured to analyse said measurement signals to detect signals characteristic of an aircraft.

18. An apparatus as claimed in claim 17 wherein said signals characteristic of an aircraft are tonal measurement signals from a predetermined number of the plurality of sensing portions.

19. A method of distributed acoustic sensing comprising:
  interrogating an optical fibre with optical radiation and producing a measurement signal indicative of incident acoustic signals from each of a plurality of sensing portions of said optical fibre;
  analysing said measurement signals to identify a signal characteristic of a Doppler shift so as to detect a moving object wherein the characteristic of a Doppler shift comprises a change in frequency over time of an acoustic signal detected at a particular sensing portion of the optical fiber; and wherein the processor is configured to analyze the measurement signals from a plurality of sensing portions to determine a rate of change of frequency of a detected acoustic signal and to determine the time at which the maximum rate of change of frequency occurs for each sensing portion; and
  providing an output of an indication of the heading and/or distance of the moving object with respect to the optical fibre.

20. A method as claimed in claim 19 wherein said optical fibre is deployed along the length of the border or perimeter and said method comprises monitoring of said border or perimeter.

21. A method as claimed in claim 19 comprising detecting an acoustic signal from an acoustic transmitter located on the object.

22. A method as claimed in claim 21 comprising fitting an object to be detected with an acoustic transducer arranged to produce an acoustic output at a defined frequency.

23. A distributed acoustic sensor apparatus comprising:
  a length of optical fibre having a plurality of sensing portions;
  an interrogator unit attached to an end of the optical fibre, the interrogator unit interrogating an the optical fibre with optical radiation and producing a measurement signal indicative of incident acoustic signals from each of a plurality of sensing portions of said optical fibre;
  a processor configured to analyse said measurement signals to identify a signal characteristic of a Doppler shift to thereby detect a moving object wherein the characteristic of a Doppler shift comprises a change in frequency over time of an acoustic signal detected at a particular sensing portion of the optical fiber and wherein the processor is configured to analyze the measurement signals from the plurality of sensing portions to determine a rate of change of frequency of a detected acoustic signal and to determine the time at which the maximum rate of change of frequency occurs for each sensing portion; and
  an output triggered by the processor upon detection of the moving object.

24. The distributed acoustic sensor apparatus of claim 23 wherein the optical fibre is buried and wherein the object is an air vehicle.

* * * * *